May 11, 1926.
J. SCHAUB ET AL
STEAM VALVE
Filed Oct. 10, 1924
1,583,800
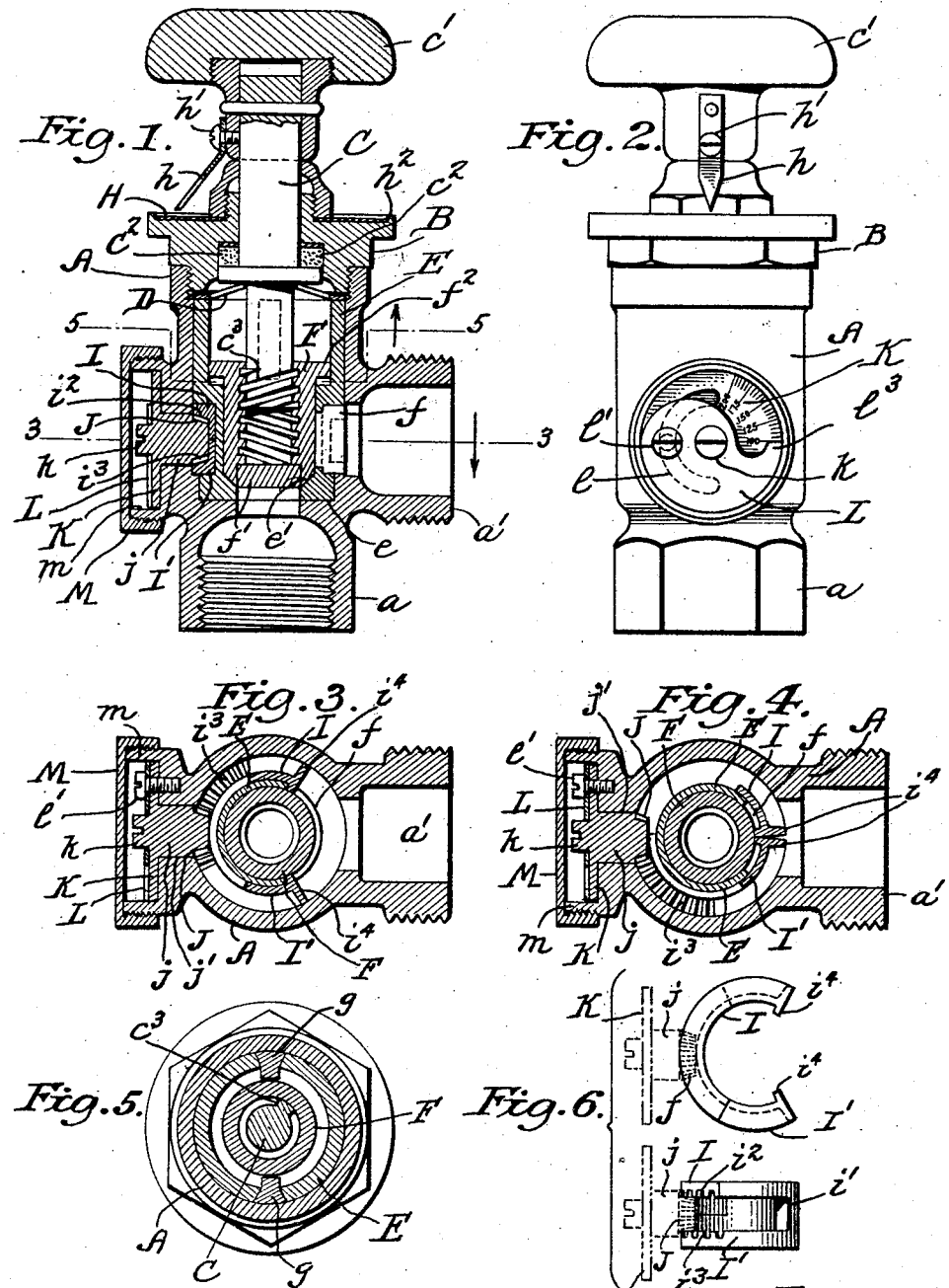

Patented May 11, 1926.

1,583,800

UNITED STATES PATENT OFFICE.

JACOB SCHAUB, OF LAWRENCEBURG, INDIANA, AND STEDMAN D. HARDING, OF BROOKLYN, NEW YORK; SAID SCHAUB ASSIGNOR TO SAID HARDING.

STEAM VALVE.

Application filed October 10, 1924. Serial No. 742,772.

This invention is a steam valve, wherein provision is made for effecting a variation in the area of the port independently of the movement or position of the member which is actuated manually to open and close the port, whereby the valve is adapted to be set for supplying a predetermined maximum volume of fluid, such as steam, when the valve member is fully open.

An object of the invention is to provide a simple steam valve especially adapted for service in connection with a radiator for the purpose of supplying steam to the radiator according to a desired capacity of said radiator for heating a room of a determined size.

A salient feature of the invention is a plurality of gates movable relatively to a port through which fluid is adapted to flow, combined with a settable member operatively connected with said gates and adapted to be shifted for the purpose of imparting movement simultaneously to said gates in order to position the latter for varying the area of the fluid port.

In a preferred form, the movable gates are positioned for sliding movement in arcuate paths with respect to a bushing provided with the fluid port, said bushing having, also, a guide-way for the movable gates. Said gates are provided with racks with which engage the teeth of a pinion that is fast with a rotative setting member, the latter being positioned within a recess provided on or within a part of the valve shell so as to be accessible for inspection and manipulation. This settable member is graduated and cooperable with an indicating member, and said member is movable as required for rotating the pinion and imparting movement to the gates with reference to the fluid port.

The bushing is fixedly positioned within the valve shell, and said bushing is provided with a seat with which is adapted to contact a movable valve member the travel of which is limited to sliding movement within the bushing by one or more guide keys.

Other functions and advantages of the invention will appear from the following description taken in connection with the drawings, wherein—

Figure 1 is a vertical central section partly in elevation of a steam valve embodying the invention.

Figure 2 is an elevation thereof, with the cap removed to illustrate the indicator for the gate members that vary the area of the fluid port.

Figures 3 and 4 are horizontal sectional views on the line 3—3 of Figure 1, the former illustrating the gates in a wide open position and the latter showing the gates in a closed position.

Figure 5 is a horizontal section on the line 5—5 of Figure 1.

Figure 6 illustrates views in plan and side elevation of the gates, the dotted lines showing the settable member and the gate-actuating pinion.

A designates a valve shell or body which is shown as provided with a threaded inlet connection $a$ and with a similar threaded outlet connection $a'$. At the end opposite the intake $a$, the shell or body is closed by a threaded removable closure B which is screwed into a threaded part of the shell, and through an axial opening in said closure passes a non-slidable stem C, provided at its upper end with a head $c'$, composed usually of heat insulating material. At the intermediate end, the stem is provided with an enlarged flange $c$ which is engaged on one side with a spring member D, and on the other side by a packing $C^2$, the latter being confined within a recess $c^2$ provided in the closure B on the under side thereof. The spring member D is shown as a washer which is divided or split and formed of irregular or dished cross section, so that the washer has frictional contact with the flange $c$ of the stem for arresting the sliding motion of the stem within the closure, although the stem is free to rotate within the closure and the shell or body.

Within the shell or body and positioned adjacent to the intake $a$ and crossing the outlet $a'$, is a bushing or retainer shell E. Said bushing is in the form of a sleeve held fixedly within the valve shell, said sleeve or bushing being open at the upper end. At the lower end, the bushing is seated upon a flange $e$ provided interiorly of the shell A, and said lower end of the bushing is provided with a valve seat $e'$ upon which is adapted to rest a valve member F. The bushing is provided in one side with a fluid port $f$ of fixed area, said port $f$ being in communication with the axial chamber of the bushing and in register with the opening in the outlet $a'$. The valve member F is of tubular formation, and is provided at its lower extremity with a part $f'$ acting as a closure and is provided, also, with an internal or female thread of coarse pitch with which meshes a similar pitch male thread $c^3$ formed in the lower end portion of the non-slidable rotatable spindle C. The tubular valve member F is provided at its upper end with an external collar $f^2$, the latter having notches (not shown) in which are received the guide keys $g$, $g$, shown in Figure 5, the function of which is to restrain the valve member F from rotative movement within the bushing and to permit said valve member to slide freely in an up and down direction within the bushing and the valve shell. The sliding motion is given to the valve member by a rotative motion of the spindle C owing to the male thread $c^3$ of the stem engaging with the female thread within the tubular valve member, and thus the valve member is operated by the threaded connection with the stem for the purpose of shifting said valve member to open and closed positions. For indicating the open and closed positions of the valve, we have provided an index finger $h$ fixed to the valve stem C by a screw $h'$, said finger being inclined toward a dial plate H seated in a recess $h^2$ at the top of the valve shell A, and which dial is provided with suitable inscriptions to denote said open and closed positions of the valve member.

The fixed bushing E is provided near its lower part with an external groove $i$ the function of which is a guideway for a plurality of gates I I'. Said gates are of arcuate formation, snugly fitted within the guideway $i$ and recessed at $i'$ for the reception of a beveled pinion J on a rotatable setting member K. The gate I is provided with bevel gear teeth $i^2$ constituting a rack on the lower edge of said gate, and the other gate I' is provided on a top edge thereof with other bevel gear teeth $i^3$ constituting a rack, said racks $i^2$ $i^3$ of the gates I I', respectively, being in facing relation and the teeth of said racks $i^2$ $i^3$ being in mesh with the bevel gear pinion J, as shown in Figure 1. The gear pinion J is unitary with an annular gear body $j$ which is mounted for rotative movement in an opening $j'$ serving as a bearing provided in the valve shell A on the side thereof opposite to the outlet $a'$, and on this gear body $j$ is provided the setting member K, herein shown as a disk made integral with the gear body $j$. This settable member is provided with a nicked stud $k$ for the reception of a screw driver or other implement, whereby rotative motion may be given conveniently to the member K, the gear body $j$ and the beveled gear pinion J, so that the gates I I' may be shifted simultaneously and in arcuate paths within the guide way $i$ of the fixed bushing E. The settable member is provided with an arcuate slot $l$, shown partly in dotted lines in Figure 2, and through this slot passes a binding screw $l'$ which finds a threaded bearing tapped in the shell or body A. An indicating member L in the form of a cut away washer is fitted against the outer face of the settable member. The member K is inscribed on its outer face with graduations, as shown in Figure 2, to denote the volume of fluid adapted to flow through the port provided by the gates I I', and with this dial face of said member K co-operates an index finger $l^3$ provided by the cut away edge of the washer L, see Figure 2. The member K and washer L are positioned within a recess formed on one of the vertical sides of the shell or body A by a protruding boss $m$, and on this boss is screwed a threaded flanged cap M, adapted to be unscrewed to provide for access to the settable member K, said cap serving as a closure to preclude easy access to the gate-adjusting means by unauthorized persons.

The gates I I' are movable in arcuate paths within the guide way $i$ of the bushing, and said gates are shiftable with respect to the port $f$, see Figures 3 and 4, for the purpose of varying the effective area of said port. At their outer ends, the gates I I' are shown as having enlarged flanges $i^4$, and when the gates are shifted to a fully closed position, as in Figure 4, these flanges $i^4$ are in abutting contact, although it is desired to state that in the service of the valve the gates are not intended to be adjusted to the fully closed position of Figure 4.

The operation will be understood from the foregoing description taken in connection with the drawings. In the service of the valve, the effective area of the port $f$ for the steam to be supplied to a radiator of a given capacity is determined, and the workman unscrews the cap M and loosens the binding screw $l'$, after which a screw driver is fitted to the nicked stud $k$ and the member K is rotated a certain angular distance for shifting the dial face of the member K with respect to the pointer $l^3$ of the washer L. This rotative motion of the settable member is communicated to the bevel pinion J, and said pinion acts on the racks $i^2$ $i^3$ of the gates I I', thus shifting the gates simultaneously and to an equal extent, said gates being movable with respect to the port $f$ in order to vary the effective area of said port. The screw $l'$ is now tightened for clamping the member K, pinion J and gates I I' in fixed positions, and then the cap M is replaced. To open the valve, the stem C is rotated in one direction for the finger $h$ to denote on the dial H the open position, and the rotative movement of the stem is communicated by the screw $c^3$ to the valve member F, thus opening the steam way to the port $f$. A reverse motion of the stem C for the finger to denote the closed position on the dial H, shifts the valve member F into contact with the valve seat $e'$, and thus the valve is adapted to shut off the flow of fluid through the port $f$.

This invention provides a valve structure wherein the valve member is shifted to open and closed positions, whereas the gates I I' provide means for determining with accuracy the flow of steam in the required volume and at the desired pressure to the radiator in order to feed the steam to said radiator for heating a room of a given size.

Having thus fully described the invention, what we claim as new and desire to secure by Letters Patent is:

1. In a device of the class described, a valve body having a fluid port, a movable valve member for opening and closing said fluid port, and a plurality of gates shiftable relatively to each other and to the port for effecting a variation in the effective area of the port.

2. In a device of the class described, a valve body having a fluid port, a movable valve member for opening and closing said fluid port, a plurality of gates movable relatively to each other and to the port for effecting a variation in the effective area of said port, and setting means operable at will for shifting said gates.

3. In a device of the class described, a valve body having a fluid port, a movable valve member for opening and closing said fluid port, a plurality of gates movable in arcuate paths relatively to each other and to said port whereby the effective area of said fluid port is variable at will, and setting means operatively connected to said gates for shifting the latter relatively to said port.

4. In a device of the class described, a valve body having a fluid port, a movable valve member for opening and closing said fluid port, a plurality of gates movable relatively to each other and to the port for effecting a variation in the area of said port, and setting means operable for shifting the gates simultaneously with respect to said port, said setting means operating to retain the gates normally in fixed positions with reference to the port.

5. In a device of the class described, a valve body having a fluid port, a movable valve member for opening and closing said fluid port, a plurality of arcuate gates provided with racks, a setting gear member meshing with said racks for shifting said gates with respect to the port and thereby effect a variation in the effective area of said port, and means for retaining said setting gear member in adjusted position.

6. In a device of the class described, a valve body having a fluid port, a valve member limited to slidable movement for opening and closing said fluid port to the flow of fluid, a rotatable stem operatively connected with said valve member, a plurality of gates separate from said valve member, and means operable at will for shifting the gates relatively to the port and independently of said valve member whereby said gates are shiftable for varying the effective area of said fluid port.

7. In a device of the class described, a valve body having a fluid port, a valve member limited to slidable movement for opening and closing said fluid port to the flow of fluid, a rotatable stem operatively connected with said valve member, a plurality of gates movable in arcuate paths transversely to the direction of movement of the valve member, and setting means connected with said gates for shifting the latter to variable positions relatively to said fluid port for changing the effective area of the fluid port.

8. In a device of the class described, a valve body having a fluid port, a valve member for opening and closing the flow of fluid through said port, a plurality of gates movable transversely to said valve member, setting means operable at will for effecting the movement of said gates relatively to the port and thereby effect a variation in the effective area of said fluid port, and indicating means co-operable with the setting means.

9. In a device of the class described, a valve body having a fluid port, a bushing provided with a raceway and a port adapted to communicate with the first mentioned port, a valve member slidable within the bushing for opening and closing said fluid port therein to the flow of fluid therethrough, a plurality of gates movable within the raceway of the bushing, and a setting member geared to said gates for shifting the latter with reference to the port of the bushing whereby the effective area of said bushing port is changed by the relative movement of said gates.

10. In a device of the class described, a valve body having a fluid port, a fixed bushing therein provided with a fluid port adapted to communicate with the first mentioned port and with an annular raceway, a valve member for opening and closing the fluid port in the bushing to the flow of fluid therethrough, a plurality of arcuate gates movable within the raceway, said gates being movable relatively to the fluid port of the bushing for varying the effective area thereof, and a setting member geared to said gates.

11. In a device of the class described, a valve body having a fluid port, a fixed bushing therein provided with a fluid port adapted to communicate with the first mentioned port and with an annular raceway, a valve member movable within the bushing, a plurality of gates movable within the raceway for effecting a variation in the area of said port, a setting member rotatably mounted in the body and geared to the gates, indicating means co-operable with the setting member, and means for retaining said setting member in fixed relation to the bushing.

In testimony whereof we have hereto signed our names this 17th day of September and 9th day of October, 1924.

JACOB SCHAUB.
STEDMAN D. HARDING.